United States Patent
Nakatani

(10) Patent No.: US 8,302,583 B2
(45) Date of Patent: Nov. 6, 2012

(54) EXHAUST GAS RECIRCULATION SYSTEM AND EXHAUST GAS RECIRCULATION METHOD FOR INTERNAL COMBUSTION ENGINE

(75) Inventor: Koichiro Nakatani, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 418 days.

(21) Appl. No.: 12/532,923

(22) PCT Filed: Jun. 11, 2008

(86) PCT No.: PCT/IB2008/001490
§ 371 (c)(1),
(2), (4) Date: Sep. 24, 2009

(87) PCT Pub. No.: WO2008/152473
PCT Pub. Date: Dec. 18, 2008

(65) Prior Publication Data
US 2010/0115945 A1    May 13, 2010

(30) Foreign Application Priority Data
Jun. 13, 2007   (JP) ................................. 2007-156468

(51) Int. Cl.
*F02M 25/07* (2006.01)
*F02B 47/08* (2006.01)
*F02B 5/00* (2006.01)

(52) U.S. Cl. ............... 123/568.14; 123/568.21; 123/305; 701/108

(58) Field of Classification Search ............. 123/562.14, 123/562.21, 568.14, 568.21, 304–305; 701/108; F02B 47/08; F02M 25/07
See application file for complete search history.

(56) References Cited

U.S. PATENT DOCUMENTS

| 6,748,936 B2 * | 6/2004 | Kinomura et al. | 123/568.14 |
| 6,968,825 B2 * | 11/2005 | Hitomi et al. | 123/406.11 |
| 7,000,380 B2 * | 2/2006 | Tokuyasu et al. | 123/568.14 |
| 7,314,041 B2 * | 1/2008 | Ogawa et al. | 123/568.14 |
| 7,334,573 B2 * | 2/2008 | Shiraishi et al. | 123/568.14 |

FOREIGN PATENT DOCUMENTS

| EP | 1 387 074 A1 | 2/2004 |
| EP | 1 429 007 A2 | 6/2004 |
| EP | 1 770 265 A2 | 4/2007 |
| JP | 2005-146960 A | 6/2005 |
| JP | 2007-192157 A | 8/2007 |
| JP | 2008-175139 A | 7/2008 |
| WO | 02/090746 A1 | 11/2002 |
| WO | WO 2008087515 A2 * | 7/2008 |

OTHER PUBLICATIONS

A fully certified translation of Axel Heinstein et al. (Pub. No. EP 1 429 007 A2), published on Jun. 16, 2004.*

* cited by examiner

Primary Examiner — Thai Ba Trieu
(74) Attorney, Agent, or Firm — Sughrue Mion, PLLC

(57) ABSTRACT

First, an amount of external EGR gas is adjusted so that an amount, by which an amount of internal EGR gas is adjusted, falls within a predetermined range (S102 to S104), and, then, the amount of internal EGR gas is adjusted when the amount, by which the amount of internal EGR gas is adjusted, falls within the predetermined range (S105 to S109) in order to execute a feedback control so that an EGR rate, which indicates a proportion of EGR gas including the external EGR gas and the internal EGR gas to intake air that is supplied to the internal combustion engine, matches a target EGR rate.

6 Claims, 3 Drawing Sheets

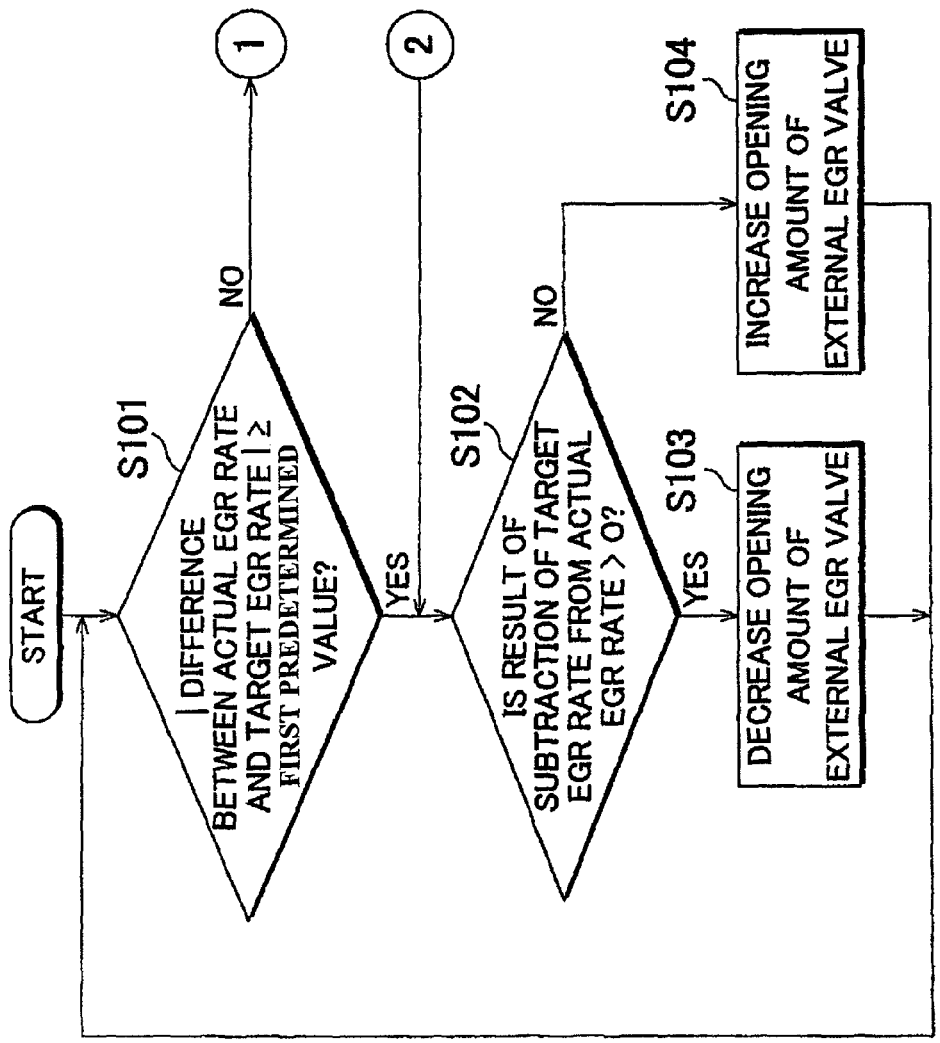

EXHAUST GAS RECIRCULATION SYSTEM AND EXHAUST GAS RECIRCULATION METHOD FOR INTERNAL COMBUSTION ENGINE

BACKGROUND OF THE INVENTION

1. Field of the Invention

The invention relates to an exhaust gas recirculation system and exhaust gas recirculation method for an internal combustion engine.

2. Description of the Related Art

Japanese Patent Application Publication No. 2005-146960 describes the following technology. In a predetermined period that is close to the time at which the combustion state in an internal combustion engine is changed, an amount of external EGR gas is adjusted by an external EGR unit so that the amount of external EGR gas that is supplied into a cylinder via the external EGR unit matches a predetermined EGR gas amount that corresponds to the combustion state after the combustion state is changed. In addition, when the amount of external EGR gas is smaller than the amount of EGR gas that should be supplied into the cylinder in the predetermined period, a portion of combustion gas is supplied as internal EGR gas into the cylinder by adjusting the opening/closing timing of the intake valve and the exhaust valve in order to cover the shortage of the EGR gas.

When the opening/closing timing of the intake valve and the exhaust valve is changed by a large amount to adjust the amount of internal EGR gas by a large amount, the temperature in the cylinder fluctuates widely. As a result, unburned HC that is discharged from the internal combustion engine excessively increases or smoke is generated, resulting in deterioration of exhaust emission.

SUMMARY OF THE INVENTION

The invention provides an exhaust gas recirculation system and exhaust gas recirculation method for an internal combustion engine with which an amount, by which an amount of internal EGR gas is adjusted, falls within a predetermined range even when an amount of EGR gas is adjusted using both external EGR gas and internal EGR gas, thereby suppressing deterioration of exhaust emission.

A first aspect of the invention relates to an exhaust gas recirculation system for an internal combustion engine including: an external EGR passage which is connected to an exhaust passage of the internal combustion engine and an intake passage of the internal combustion engine and through which a portion of exhaust gas that flows through the exhaust passage is recirculated back to the intake passage as external EGR gas; external EGR adjustment means for adjusting an amount of external EGR gas that flows through the external EGR passage; and internal EGR adjustment means for adjusting an amount of internal EGR gas which is a portion of combustion gas generated in the internal combustion engine and which is caused to remain in a cylinder of the internal combustion engine or caused to flow back from the exhaust passage into the cylinder. The exhaust gas recirculation system further includes EGR control means. The EGR control means first adjusts the amount of external EGR gas using the external EGR adjustment means so that an amount, by which the amount of internal EGR gas is adjusted, falls within a predetermined range. Then, the EGR control means adjusts the amount of internal EGR gas using the internal EGR adjustment means when the amount, by which the amount of internal EGR gas is adjusted, falls within the predetermined range. In this way, a feedback control is executed so that an EGR rate, which indicates a proportion of EGR gas including the external EGR gas and the internal EGR gas to intake air that is supplied to the internal combustion engine, matches a target EGR rate.

The exhaust gas recirculation system mixes the EGR gas with the intake air that is supplied to the internal combustion engine to decrease the temperature at which the air-fuel mixture is burned in a combustion chamber using the EGR gas mixed with the intake air. In this way, the amount of nitrogen oxide (NOx) that is generated in the internal combustion engine is decreased. As a result, the amount of NOx that is discharged from the internal combustion engine to the atmosphere is decreased.

There are two methods for mixing the EGR gas with the intake air. According to one of the methods, the external EGR gas is recirculated back from the exhaust passage to the intake passage through the external EGR passage that is located outside the internal combustion engine. According to the other method, the internal EGR gas is caused to remain within a cylinder of the internal combustion engine or to flow back from the exhaust passage into the cylinder by changing the opening/closing timing of an intake valve and an exhaust valve. The feedback control is executed so that the EGR rate matches the target EGR rate by using the external EGR gas and the internal EGR gas in combination.

However, when the opening/closing timing of the intake valve and the exhaust valve is changed by a large amount to adjust the amount of internal EGR gas by a large amount, the temperature in the cylinder may fluctuate widely. Accordingly, the unburned HC that is discharged from the internal combustion engine excessively increases or smoke is generated, resulting in deterioration of exhaust emission.

Therefore, according to the first aspect of the invention, first, the amount of external EGR gas is adjusted by the external EGR adjustment means so that the amount, by which the amount of internal EGR gas is adjusted, falls within the predetermined range. Then, the amount of internal EGR gas is adjusted by the internal EGR adjustment means when the amount, by which the amount of internal EGR gas is adjusted, falls within the predetermined range.

If the amount, by which the amount of internal EGR gas is adjusted, exceeds the upper limit of the predetermined range, the opening/closing timing of the intake valve and the exhaust valve is changed by a large amount, which causes wide fluctuation of the temperature in the cylinder. Accordingly, the unburned HC that is discharged from the internal combustion engine excessively increases or smoke is generated, resulting in deterioration of the exhaust emission.

According to the first aspect of the invention, first, the amount of external EGR gas is roughly adjusted so that the EGR rate approaches the target value, and finally, the amount of internal EGR gas is adjusted minutely so that the EGR rate accurately matches the target value. In addition, the path through which the internal EGR gas is recirculated back to the cylinder is relatively short because the internal EGR gas does not flow through the recirculation passage that is located outside the internal combustion engine. Accordingly, it takes relatively a short time for the internal EGR gas to recirculate back to the cylinder. Therefore, using the internal EGR gas makes it possible to change the EGR rate quickly in response to a change in the target value.

The amount of external EGR gas is adjusted so that the amount, by which the amount of internal EGR gas is adjusted, falls within the predetermined range. Therefore, the amount, by which the amount of internal EGR gas is adjusted, does not exceed the upper limit of the predetermined range. Accordingly, it is not necessary to change the opening/closing timing of the intake valve and the exhaust valve by a large amount in order to adjust the amount of internal EGR gas by a large amount. Accordingly, the temperature in the cylinder does not fluctuate widely. As a result, it is possible to suppress an excessive increase in the unburned HC that is discharged from the internal combustion engine, generation of smoke, and deterioration of the exhaust emission.

When the amount, by which the amount of internal EGR gas is adjusted, falls outside the predetermined range if the amount of internal EGR gas is adjusted by the internal EGR adjustment means, the EGR control means may first adjust the amount of external EGR gas using the external EGR adjustment means, and then adjust the amount of internal EGR gas using the internal EGR adjustment means.

If the variation in the EGR rate is accommodated only by adjusting the amount of internal EGR gas, the amount by which the internal EGR gas is adjusted may fall outside the predetermined range. In this case, if the variation in the EGR rate is accommodated only by adjusting the amount of internal EGR gas, the exhaust emission deteriorates.

Therefore, according to the first aspect of the invention, when the amount by which the internal EGR gas amount is adjusted does not fall within the predetermined range, first, the amount of external EGR gas is adjusted by the external EGR adjustment means, and then, the amount of internal EGR gas is adjusted by the internal EGR adjustment means.

According to the first aspect of the invention, when the amount by which the internal EGR gas amount is adjusted does not fall within the predetermined range if the variation in the EGR rate is accommodated only by adjusting the amount of internal EGR gas, the amount of external EGR gas is roughly adjusted so that the EGR rate approaches the target EGR rate, and then, the amount of internal EGR gas is minutely adjusted so that the EGR rate accurately matches the target EGR rate.

The EGR control means may reserve a predetermined amount of internal EGR gas in advance using the internal EGR adjustment means before executing the feedback control.

If the predetermined amount of internal EGR gas is reserved, shortage in the amount of internal EGR gas does not occur even if the amount of internal EGR gas is decreased by the maximum amount when the amount of internal EGR gas is adjusted within the predetermined range during the feedback control over the EGR rate.

The feedback control over the EGR rate is executed also when the amount of EGR gas needs to be decreased because there is excessive amount of EGR gas. In this case, the EGR gas needs to be present in advance so that the amount of internal EGR gas is decreased.

Therefore, according to the first aspect of the invention, the predetermined amount of internal EGR gas is reserved in advance by the internal EGR adjustment means before the feedback control over the EGR rate is executed.

According to the first aspect of the invention, when the amount of internal EGR gas needs to be decreased, it is possible to decrease the internal EGR gas by the predetermined amount. Therefore, it is possible to accurately bring the EGR rate to the target value by adjusting the amount of internal EGR gas in the entire engine operating region.

The EGR control means may extend the predetermined range within which the amount of internal EGR gas is adjusted when the internal combustion engine is operating at low load, and the EGR control means may narrow the predetermined range within which the amount of internal EGR gas is adjusted when the internal combustion engine is operating at high load.

When the internal combustion engine is operating at low load, if the amount of internal EGR gas is excessively decreased, the temperature in the cylinder is excessively decreased, resulting in discharge of unburned HC. When the internal combustion engine is operating at high load, if the amount of internal EGR gas is excessively increased, smoke may be generated. However, if the amount of internal EGR gas is increased when the internal combustion engine is operating at low load or if the amount of internal EGR gas is decreased when the internal combustion engine is operating at high load, the exhaust emission does not significantly deteriorate.

Therefore, according to the first aspect of the invention, the predetermined range, within which the amount of internal EGR gas is adjusted, is extended when the internal combustion engine is operating at low load, and the predetermined range, within which the amount of internal EGR gas is adjusted, is narrowed when the internal combustion engine is operating at high load.

According to the first aspect of the invention, it is possible to accurately bring the EGR rate to the target EGR rate while suppressing deterioration of the exhaust emission.

The EGR control means may retard timing at which fuel is injected into the cylinder when the amount of internal EGR gas is increased by the internal EGR adjustment means, and the EGR control means may advance the timing at which the fuel is injected into the cylinder when the amount of internal EGR gas is decreased by the internal EGR adjustment means.

If the amount of internal EGR gas is increased, the smoke increases because the temperature in the cylinder increases. On the other hand, if the amount of internal EGR gas is decreased, the unburned HC that is discharged from the internal combustion engine increases because the temperature in the cylinder decreases.

However, according to the first aspect of the invention, the timing at which the fuel is injected into the cylinder is retarded when the amount of internal EGR gas is increased in order to suppress an increase in smoke. On the other hand, when the amount of internal EGR gas is decreased, the timing at which the fuel is injected into the cylinder is advanced in order to suppress an increase in the unburned HC.

According to the first aspect of the invention, it is possible to provide the exhaust gas recirculation system for an internal combustion engine, with which the amount, by which the amount of internal EGR gas is adjusted, falls within the predetermined range even when the amount of EGR gas is adjusted using both the external EGR gas and the internal EGR gas, thereby suppressing deterioration of exhaust emission.

A second aspect of the invention relates to an exhaust gas recirculation method for an internal combustion engine that is provided with: an external EGR passage which is connected to an exhaust passage of the internal combustion engine and an intake passage of the internal combustion engine and through which a portion of exhaust gas that flows through the exhaust passage is recirculated back to the intake passage as external EGR gas; external EGR adjustment means for adjusting an amount of external EGR gas that flows through the external EGR passage; and internal EGR adjustment means for adjusting an amount of internal EGR gas which is a portion of combustion gas generated in the internal combustion engine and which is caused to remain in a cylinder of the internal combustion engine or caused to flow back from the exhaust passage into the cylinder. According to the exhaust gas recirculation method, first, the amount of external EGR gas is adjusted by the external EGR adjustment means so that an amount, by which the amount of internal EGR gas is adjusted, falls within a predetermined range. Then the amount of internal EGR gas is adjusted by the internal EGR adjustment means when the amount, by which the amount of internal EGR gas is adjusted, falls within the predetermined range. In this way, a feedback control is executed so that an EGR rate, which indicates a proportion of EGR gas including the external EGR gas and the internal EGR gas to intake air that is supplied to the internal combustion engine, matches a target EGR rate.

BRIEF DESCRIPTION OF THE DRAWINGS

The foregoing and further features and advantages of the invention will become apparent from the following description of example embodiments with reference to the accompanying drawings, wherein the same or corresponding portions will be denoted by the same reference numerals and wherein:

FIGS. 2A and 2B are flowcharts showing a routine of a feedback control over an EGR rate according to the embodiment of the invention.

DETAILED DESCRIPTION OF THE EMBODIMENT

Hereafter, an example embodiment of the invention will be described in detail.

Figure 1:
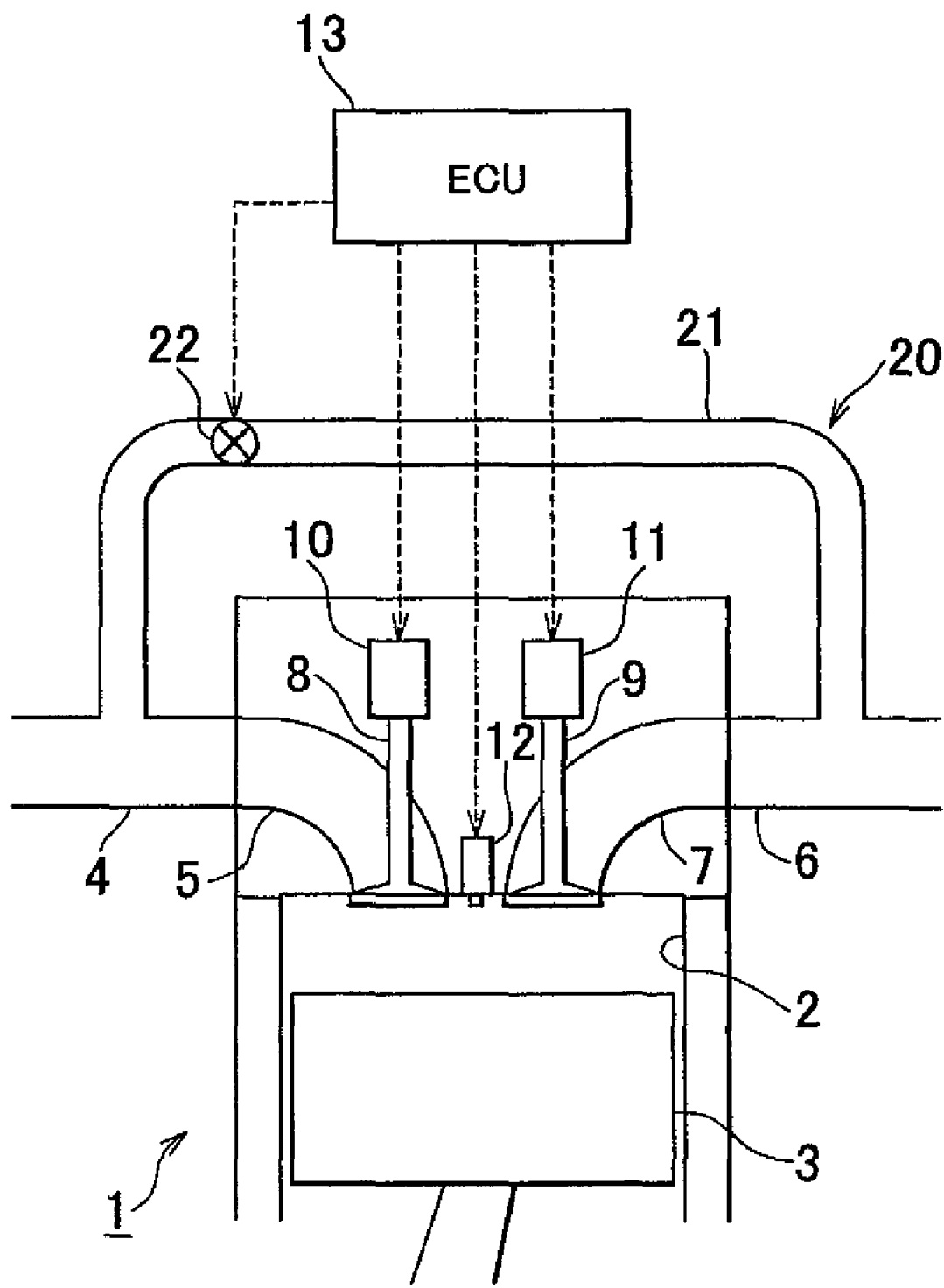
FIG. 1 is a view schematically showing the structure of an internal combustion engine according to an embodiment of the invention.

FIG. 1 is a view schematically showing the structure of an internal combustion engine 1 to which an exhaust gas recirculation system for an internal combustion engine according to an embodiment of the invention is applied. The internal combustion engine 1 shown in FIG. 1 is a water-cooled four-stroke cycle diesel engine having four cylinders 2.

A piston 3 is slidably arranged in each of the cylinders 2 of the internal combustion engine 1. An intake port 5 that leads to an intake passage 4, through which intake air is supplied to the internal combustion engine 1, and an exhaust port 7 that leads to an exhaust passage 6, through which exhaust gas is discharged from the internal combustion engine 1, are connected to a combustion chamber formed at an upper portion within the cylinder 2.

The intake port 5 and the exhaust port 7 have openings to the combustion chamber. The opening of the intake port 5 and the opening of the exhaust port 7 are opened and closed by an intake valve 8 and an exhaust valve 9, respectively. The intake valve 8 is provided with an intake VVT (valve timing) mechanism 10 that controls the valve timing of the intake valve 8. The exhaust valve 9 is provided with an exhaust VVT mechanism 11 that controls the valve timing of the exhaust valve 9.

Commands are transmitted to the intake VVT mechanism 10 and the exhaust VVT mechanism 11 to retard the opening timing of the intake valve 8 and the closing timing of the exhaust valve 9. As a result, a portion of the gas that has been burned in the combustion chamber of the internal combustion engine 1 remains within the cylinder 2, or a portion of the burned gas that is once discharged to the exhaust passage 4 flows back into the cylinder 2. In this way, the burned gas is supplied into the cylinder 2. In the embodiment of the invention, the burned gas that is supplied to the cylinder 2 in the above-described manner will be referred to as "internal EGR gas".

Then, commands are transmitted to the intake VVT mechanism 10 and the exhaust VVT mechanism 11 to retard or advance the opening timing of the intake valve 8 and to retard or advance the closing timing of the exhaust valve 9, respectively, whereby the amount of internal EGR gas is adjusted. The intake VVT mechanism 10, which retards or advances the opening timing of the intake valve 8, and the exhaust VVT mechanism 11, which retards or advances the closing timing of the exhaust valve 9, correspond to internal EGR adjustment means according to the invention. However, another device that adjusts the amount of internal EGR gas, for example, a unit that transmits a command at least to the exhaust VVT mechanism 11 to control the closing timing of the exhaust valve 9, thereby supplying the internal EGR gas, may be used as the internal EGR adjustment means.

A fuel injection valve 12, which injects fuel directly into the combustion chamber, is fitted to the upper face of the cylinder 2.

The internal combustion engine 1 is provided with an external EGR unit 20 that recirculates a portion of exhaust gas, which flows through the exhaust passage 6, back to the intake passage 4. The external EGR unit 20 includes an external EGR passage 21 and an external EGR valve 22.

The external EGR passage 21 connects the exhaust passage 6 to the intake passage 4. The exhaust gas is introduced into the internal combustion engine 1 through the external EGR passage 21. In the embodiment of the invention, the exhaust gas that is recirculated back to the intake passage 6 through the external EGR passage 21 will be referred to as "external EGR gas".

The external EGR valve 22 is provided in the external EGR passage 21, and adjusts the amount of external EGR gas that flows through the external EGR passage 21 by adjusting the flow passage area of the external EGR passage 21. The external EGR valve 22 corresponds to external EGR adjustment means according to the invention. However, another device that adjusts the amount of external EGR gas may be used as the external EGR adjustment means. For example, an intake throttle valve that is arranged in the intake passage 4 may be used as the external EGR adjustment means.

The internal combustion engine 1 structured as described above is provided with an ECU 13 that controls the internal combustion engine 1. The ECU 13 is a unit that controls the operating state of the internal combustion engine 1 based on the operating conditions of the internal combustion engine 1 and a request from a driver.

Various sensors are connected via electric wires to the ECU 13, and signals output from these sensors are transmitted to the ECU 13.

Actuators for the external EGR valve 22, the intake VVT mechanism 10, the exhaust VVT mechanism 11, and the fuel injection valve 12 are connected via electric wires to the ECU 13. The ECU 13 controls these devices.

The EGR gas is mixed with the intake air that is supplied to the internal combustion engine 1 in order to reduce the amount of NOx that is discharged from the internal combustion engine 1 into the atmosphere. The temperature at which the air-fuel mixture is burned in the combustion chamber is decreased by the EGR gas that is mixed with the intake air. In this way, generation of NOx is suppressed.

The EGR gas that is mixed with the intake air includes the internal EGR gas and the external EGR gas. The external EGR gas and the internal EGR gas are used in combination, and a feedback control is executed to achieve a target EGR rate.

If the opening timing of the intake valve 8 and the closing timing of the exhaust valve 9 are retarded or advanced by a large amount to adjust the amount of internal EGR gas by a large amount, the temperature in the cylinder 2 fluctuates widely. As a result, the amount of unburned HC that is discharged from the internal combustion engine 1 excessively increases or smoke is generated, resulting in deterioration of exhaust emission.

Therefore, according to the embodiment of the invention, the feedback control is executed so that the EGR rate, which indicates the proportion of the amount of EGR gas including the external EGR gas and the internal EGR gas to the amount of intake air, matches the target value. In the embodiment of the invention, first, when the absolute value of the difference between the actual EGR rate and the target EGR rate is equal to or larger than a predetermined value, the amount of external EGR gas is roughly adjusted by the external EGR valve 22 so that the amount, by which the amount of internal EGR gas is adjusted, falls within a predetermined range. Then, when the absolute value of the difference between the actual EGR rate and the target EGR rate is smaller than the predetermined value, that is, when the amount, by which the amount of internal EGR gas is adjusted, falls within the predetermined range, commands are transmitted to the intake VVT mechanism 10 and the exhaust VVT mechanism 11 to retard or advance the opening timing of the intake valve 8 and to retard or advance the closing timing of the exhaust valve 9. In this way, the amount of internal EGR gas is adjusted minutely.

The predetermined value, which is compared with the absolute value of the difference between the actual EGR rate and the target EGR rate, is a value that indicates the upper limit of the predetermined range within which the amount, by which the amount of internal EGR gas is adjusted, should fall. If the required amount of EGR gas is obtained only by adjusting the amount of internal EGR gas when the absolute value is equal to or larger than the predetermined value, the opening timing of the intake valve 8 and the closing timing of the exhaust valve 9 are retarded or advanced by a large amount, and therefore the temperature in the cylinder 2 fluctuates widely. As a result, the amount of unburned HC that is discharged from the internal combustion engine 1 excessively increases or smoke is generated, resulting in deterioration of exhaust emission.

According to the embodiment of the invention, first, the amount of external EGR gas is roughly adjusted so that the EGR rate approaches the target value, and finally, the amount of internal EGR gas is adjusted minutely so that the EGR rate accurately matches the target value. In addition, the path through which the internal EGR gas is recirculated back to the cylinder is relatively short because the internal EGR gas does not flow through the recirculation passage that is located outside the internal combustion engine 1. Accordingly, it takes relatively a short time for the internal EGR gas to recirculate back to the cylinder. Therefore, using the internal EGR gas makes it possible to change the EGR rate quickly in response to a change in the target value.

If the absolute value of the difference between the actual EGR rate and the target EGR rate is equal to or larger than the predetermined value, the amount of external EGR gas is adjusted so that the amount, by which the amount of internal EGR gas is adjusted, falls within the predetermined range. Therefore, the amount by which the internal EGR gas is adjusted does not exceed the upper limit of the predetermined range. Accordingly, when the absolute value of the difference between the actual EGR rate and the target EGR rate is equal to or larger than the predetermined value, it is not necessary to retard or advance the opening timing of the intake valve 8 and the closing timing of the exhaust valve 9 by a large amount to adjust the amount of internal EGR gas by a large amount.

Therefore, the temperature in the cylinder 2 does not fluctuate widely. As a result, it is possible to suppress an excessive increase in the unburned HC that is discharged from the internal combustion engine 1, generation of smoke, and deterioration of the exhaust emission.

If the variation in the EGR rate is accommodated only by adjusting the amount of internal EGR gas, the absolute value of the difference between the actual EGR rate and the target EGR rate may be equal to or larger than the predetermined value and the amount by which the internal EGR gas is adjusted may not fall within the predetermined range. In this case, if the variation in the EGR rate is accommodated only by adjusting the amount of internal EGR gas, the exhaust emission deteriorates.

Therefore, according to the embodiment of the invention, when the absolute value of the difference between the actual EGR rate and the target EGR rate is equal to or larger than the predetermined value and the amount by which the internal EGR gas amount is adjusted does not fall within the predetermined range if the variation in the EGR rate is accommodated only by adjusting the amount of internal EGR gas, the amount of external EGR gas is roughly adjusted by the external EGR valve 22, and then, commands are output to the intake VVT mechanism 10 and the exhaust VVT mechanism 11 to retard or advance the opening timing of the intake valve 8 and to retard or advance the closing timing of the exhaust valve 9. In this way, the amount of internal EGR gas is minutely adjusted.

According to the embodiment of the invention, when the absolute value of the difference between the actual EGR rate and the target EGR rate is equal to or larger than the predetermined value and the amount by which the internal EGR gas amount is adjusted does not fall within the predetermined range if the variation in the EGR rate is accommodated only by adjusting the amount of internal EGR gas, the amount of external EGR gas is roughly adjusted so that the EGR rate is brought to a value around the target value. Finally, the EGR rate is accurately brought to the target value by adjusting the amount of internal EGR gas.

In this case, before the above-described feedback control is executed, commands are transmitted to the intake VVT mechanism 10 and the exhaust VVT mechanism 11 to retard the opening timing of the intake valve 8 and closing timing of the exhaust valve 9, whereby a predetermined amount of internal EGR gas is reserved.

If the predetermined amount of internal EGR gas is reserved, shortage in the amount of internal EGR gas does not occur even if the amount of internal EGR gas is decreased by the maximum amount when the absolute value of the difference between the actual EGR rate and the target EGR rate is smaller than the predetermined value and the amount of internal EGR gas is adjusted within the predetermined range during the feedback control over the EGR rate. In other words, the predetermined amount of internal EGR gas that is reserved is set to a value at which it is possible to execute the feedback control in such a manner that the amount of internal EGR gas is adjusted by an amount within the predetermined range only by decreasing the amount of internal EGR gas.

The feedback control over the EGR rate is executed also when the amount of EGR gas needs to be decreased because there is excessive amount of EGR gas. In this case, the EGR gas needs to be present in advance so that the amount of internal EGR gas is decreased.

Therefore, as described above, the predetermined amount of internal EGR gas is reserved before the feedback control over the EGR rate is executed. Thus, when the amount of internal EGR gas needs to be decreased, it is possible to decrease the internal EGR gas by the predetermined amount. Therefore, it is possible to accurately bring the EGR rate to the target value by adjusting the amount of internal EGR gas in the entire engine operating region.

When the internal combustion engine 1 is operating at low load, if the amount of internal EGR gas is excessively decreased, the temperature in the cylinder is excessively decreased, resulting in discharge of unburned HC. When the internal combustion engine 1 is operating at high load, if the amount of internal EGR gas is excessively increased, smoke may be generated. However, if the amount of internal EGR gas is increased when the internal combustion engine 1 is operating at low load or if the amount of internal EGR gas is decreased when the internal combustion engine 1 is operating at high load, the exhaust emission does not significantly deteriorate.

Therefore, according to the embodiment of the invention, when the internal combustion engine 1 is operating at low load, the upper limit of the predetermined range within which the amount of internal EGR gas is adjusted, that is, the predetermined value that is compared with the absolute value of the difference between the actual EGR rate and the target EGR rate, is increased in order to increase the amount of internal EGR gas. When the internal combustion engine 1 is operating at high load, the upper limit of the predetermined range within which the amount of internal EGR gas is adjusted, that is, the predetermined value that is compared with the absolute value of the difference between the actual EGR rate and the target EGR rate is decreased in order to decrease the amount of internal EGR gas. Thus, it is possible to accurately bring the EGR rate to the target value while suppressing deterioration of exhaust emission.

If the amount of internal EGR gas is increased, the smoke that is discharged increases because the temperature in the cylinder 2 increases. On the other hand, if the amount of internal EGR gas is decreased, the amount of unburned HC that is discharged from the internal combustion engine increases because the temperature in the cylinder 2 decreases.

However, according to the embodiment of the invention, when the amount of internal EGR gas is increased during the feedback control over the EGR rate, the timing at which the fuel is injected from the fuel injection valve 12 into the cylinder 2 is retarded to suppress an increase in smoke. When the amount of internal EGR gas is decreased during the feedback control over the EGR rate, the timing at which the fuel is injected from the fuel injection valve 12 into the cylinder 2 is advanced to suppress an increase in the unburned HC.

Figure 2B:
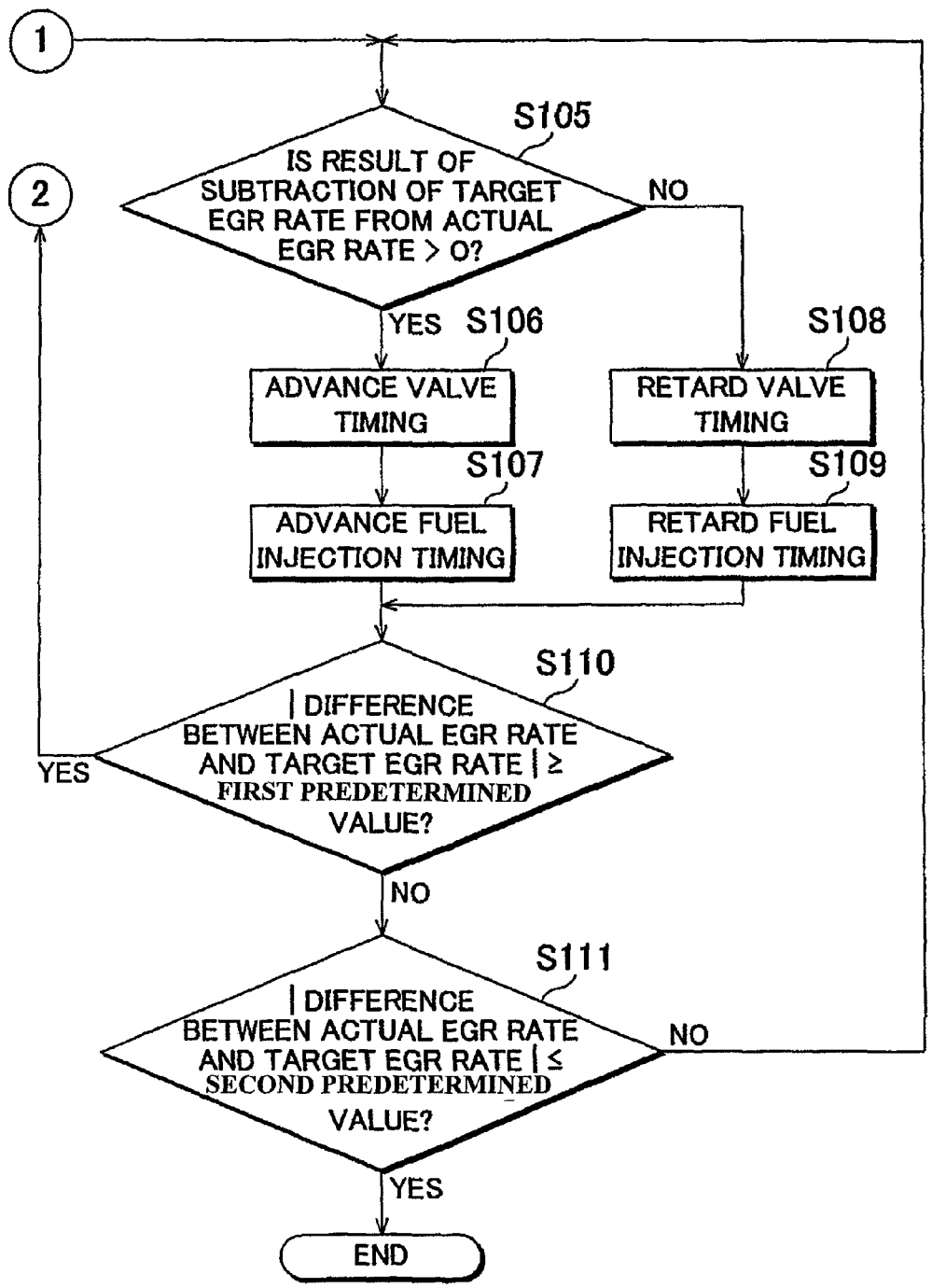

Next, the routine of the feedback control over the EGR rate according to the embodiment of the invention will be described. FIGS. 2A and 2B are flowcharts of the routine of the feedback control over the EGR rate according to the embodiment of the invention. The routine is periodically executed at predetermined time intervals. The ECU 13 that executes the routine corresponds to EGR control means according to the invention.

Before the routine is executed, commands are transmitted to the intake VVT mechanism 10 and the exhaust VVT mechanism 11 to retard the opening timing of the intake valve 8 and the closing timing of the exhaust valve 9, whereby the predetermined amount of internal EGR gas is reserved. In addition, the external EGR gas flows through the external EGR gas passage 21. Therefore, when the routine is started, both the internal EGR gas and the external EGR gas are supplied to the internal combustion engine 1 in advance.

In step (hereinafter, referred to as "S") 101, the ECU 13 subtracts the target EGR rate from the actual EGR rate, and determines whether the absolute value of the difference between the actual EGR rate and the target EGR rate is equal to or larger than a first predetermined value.

In S101, the determination is made with the operating state of the internal combustion engine 1 taken into account. When the internal combustion engine 1 is operating at low load, the first predetermined value that is compared with the absolute value of the difference between the actual EGR rate and the target EGR rate is increased. On the other hand, when the internal combustion engine is operating at high load, the first predetermined value that is compared with the absolute value of the difference between the actual EGR rate and the target EGR rate is decreased.

If it is determined in S101 that the absolute value of the difference between the actual EGR rate and the target EGR rate is equal to or larger than the first predetermined value, S102 is executed. On the other hand, if is determined in S101 that the absolute value is smaller than the first predetermined value, S105 is executed.

In S102, the ECU 13 subtracts the target EGR rate from the actual EGR rate, and determines whether the result of subtraction is a positive value.

If it is determined in S102 that the result of subtraction is a positive value (>0), S103 is executed. On the other hand, if it is determined in S102 that the result of subtraction is a negative value (<0), S104 is executed.

In S103, the ECU 13 decreases the opening amount of the external EGR valve. Thus, the amount of external EGR gas is roughly decreased to decrease the actual EGR rate, whereby the actual EGR rate approaches the target EGR rate. After completion of S103, S101 is executed.

In S104, the ECU 130 increases the opening amount of the external EGR valve. Thus, the amount of external EGR gas is roughly increased to increase the actual EGR rate, whereby the actual EGR rate approaches the target EGR rate. After completion of S104, S101 is executed.

In S105, the ECU 13 subtracts the target EGR rate from the actual EGR rate, and determines whether the result of subtraction is a positive value.

if it is determined in S105 that the result of subtraction is a positive value (>0), S106 is executed. On the other hand, if it is determined in S105 that the result of subtraction is a negative value (<0), S108 is executed.

In S106, the ECU 13 transmits commands to the intake VVT mechanism 10 and the exhaust VVT mechanism 11 to advance the opening timing of the intake valve 8 and the closing timing of the exhaust valve 9. Thus, the amount of internal EGR gas is decreased minutely to decrease the actual EGR rate, whereby the actual EGR rate approaches the target EGR rate. After completion of S106, S107 is executed.

In S107, the ECU 13 advances the timing at which the fuel is injected from the fuel injection valve 12 into the cylinder 2. Thus, an increase in the unburned HC that is discharged from the internal combustion engine 1 is suppressed. After completion of S107, S110 is executed.

In S108, the ECU 13 transmits commands to the intake VVT mechanism 10 and the exhaust VVT mechanism 11 to retard the opening timing of the intake valve 8 and the closing timing of the exhaust valve 9. Thus, the amount of internal EGR gas is minutely increased to increase the actual EGR rate, whereby the actual EGR rate approaches the target EGR rate. After completion of S108, S109 is executed.

In S109, the ECU 13 retards the timing at which the fuel is injected from the fuel injection valve 12 into the cylinder 12. Thus, an increase in smoke that is discharged from the internal combustion engine 1 is suppressed. After completion of S109, S110 is executed.

In S110, the ECU 13 subtracts the target EGR rate from the actual EGR rate, and determines whether the absolute value of the difference between the actual EGR rate and the target EGR rate is smaller than the first predetermined value.

In S110 as well as in S101, the determination is made with the operating state of the internal combustion engine 1 taken into account. When the internal combustion engine 1 is operating at low load, the first predetermined value that is compared with the absolute value of the difference between the actual EGR rate and the target EGR rate is increased. On the other hand, when the internal combustion engine is operating at high load, the first predetermined value that is compared with the absolute value of the difference between the actual EGR rate and the target EGR rate is decreased.

If it is determined in S110 that the absolute value of the difference between the actual EGR rate and the target EGR rate is smaller than the first predetermined value, S111 is executed. On the other hand, if it is determined in S110 that the absolute value of the difference between the actual EGR rate and the target EGR rate is equal to or larger than the first predetermined value, S102 is executed.

As described above, when the absolute value of the difference between the actual EGR rate and the target EGR rate is equal to or larger than the first predetermined value even after adjustment of the amount of internal EGR gas is completed, S102 is executed again to bring the EGR rate close to the target value by roughly adjusting the amount of external EGR gas, and finally, the accurately bring the EGR rate to the target value by minutely adjusting the amount of internal EGR gas.

In S111, the ECU 13 subtracts the target EGR rate from the actual EGR rate, and determines whether the absolute value of the difference between the actual EGR rate and the target EGR rate is equal to or smaller than a second predetermined value.

Preferably, the second predetermined value is smaller than the first predetermined value described above and close to zero. However, the second predetermined value may be a value other than zero, as long as it is possible to determine whether the actual EGR rate matches the target EGR rate using the second predetermined value.

If it is determined in S111 that the absolute value of the difference between the actual EGR rate and the target EGR rate is larger than the second predetermined value, S105 is executed. On the other hand, if it is determined in S111 that the absolute value of the difference between the actual EGR rate and the target EGR rate is equal to or smaller than the second predetermined value, it is determined that the actual EGR rate matches the target EGR rate and the routine ends.

According to the above-described routine, it is possible to execute the feedback control over the EGR rate by roughly adjusting the amount of external EGR gas and minutely adjusting the amount of internal EGR gas.

In the embodiment of the invention, in each of S101 and S110, the target EGR rate is subtracted from the actual EGR rate, and it is determined whether the absolute value of the difference between the actual EGR rate and the target EGR rate is equal to or larger than the first predetermined value, whereby the predetermined range within which the amount of internal EGR gas is adjusted is determined. However, the determination may be made by various methods. For example, the determination may be made based on the actual amount by which the opening timing of the intake valve 8 and the closing timing of the exhaust valve 9 is retarded or advanced.

The exhaust gas recirculation system for an internal combustion engine according to the invention is not limited to that in the embodiment described above, and may be implemented in various other embodiments within the scope of the invention.

The invention claimed is:

1. An exhaust gas recirculation system for an internal combustion engine, comprising:

an external EGR passage which is connected to an exhaust passage of the internal combustion engine and an intake passage of the internal combustion engine and through which a portion of exhaust gas that flows through the exhaust passage is recirculated back to the intake passage as external EGR gas;

an external EGR adjustment unit that adjusts an amount of external EGR gas that flows through the external EGR passage;

an internal EGR adjustment unit that adjusts an amount of internal EGR gas which is a portion of combustion gas generated in the internal combustion engine and which is caused to remain in a cylinder of the internal combustion engine or caused to flow back from the exhaust passage in to the cylinder; and an EGR control unit that first adjusts the amount of external EGR gas using the external EGR adjustment unit so that an amount, by which the amount of internal EGR gas is adjusted, falls within a predetermined range, and then adjusts the amount of internal EGR gas using the internal EGR adjustment unit when the amount, by which the amount of internal EGR gas is adjusted, falls within the predetermined range in order to execute a feedback control so that an EGR rate, which indicates a proportion of EGR gas including the external EGR gas and the internal EGR gas to intake air that is supplied to the internal combustion engine, matches a target EGR rate, wherein the EGR control unit retards timing at which fuel is injected into the cylinder when the amount of internal EGR gas is increased by the internal EGR adjustment unit, and the EGR control unit advances the timing at which the fuel is injected into the cylinder when the amount of internal EGR gas is decreased by the internal EGR adjustment unit.

2. An exhaust gas recirculation system for an internal combustion engine, comprising:

an external EGR passage which is connected to an exhaust passage of the internal combustion engine and an intake passage of the internal combustion engine and through which a portion of exhaust gas that flows through the exhaust passage is recirculated back to the intake passage as external EGR gas;

an external EGR adjustment unit that adjusts an amount of external EGR gas that flows through the external EGR passage;

an internal EGR adjustment unit that adjusts an amount of internal EGR gas which is a portion of combustion gas generated in the internal combustion engine and which is caused to remain in a cylinder of the internal combustion engine or caused to flow back from the exhaust passage into the cylinder; and an EGR control unit that first adjusts the amount of external EGR gas using the external EGR adjustment unit so that an amount, by which the amount of internal EGR gas is adjusted, falls within a predetermined range, and then adjusts the amount of internal EGR gas using the internal EGR adjustment unit when the amount, by which the amount of internal EGR gas is adjusted, falls within the predetermined range in order to execute a feedback control so that an EGR rate, which indicates a proportion of EGR gas including the external EGR gas and the internal EGR gas to intake air that is supplied to the internal combustion engine, matches a target EGR rate, wherein the EGR control unit extends the predetermined range within which the amount of internal EGR gas is adjusted when the internal combustion engine is operating at low load, and the EGR control unit narrows the predetermined range within which the amount of internal EGR gas is adjusted when the internal combustion engine is operating at high load, wherein a predetermined value that is compared with an absolute value of a difference between the actual EGR rate and the target EGR rate is increased when the internal combustion engine is operating at low load, and the predetermined value that is compared with the absolute value of the difference between the actual EGR rate and the target EGR rate is decreased when the internal combustion engine is operating at high load.

3. The exhaust gas recirculation system according to claim 2, wherein the EGR control unit adjusts the amount of external EGR gas when the absolute value of the difference between the actual EGR rate and the target EGR rate is equal to or larger than the predetermined value, and the EGR control unit adjusts the amount of internal EGR gas when the absolute value of the difference between the actual EGR rate and the target EGR rate is smaller than the predetermined value.

4. The exhaust gas recirculation system according to claim 2, wherein when the amount, by which the amount of internal EGR gas is adjusted, falls outside the predetermined range if the amount of internal EGR gas is adjusted by the internal EGR adjustment unit, the EGR control unit first adjusts the amount of external EGR gas using the external EGR adjustment unit, and then adjusts the amount of internal EGR gas using the internal EGR adjustment unit.

5. The exhaust gas recirculation system according to claim 2, wherein the EGR control unit reserves a predetermined amount of internal EGR gas in advance using the internal EGR adjustment unit before executing the feedback control.

6. The exhaust gas recirculation system according to claim 5, wherein the predetermined amount of internal EGR gas that is reserved is set to a value at which it is possible to execute the feedback control in such a manner that the amount of internal EGR gas is adjusted within the predetermined range only by decreasing the amount of internal EGR gas.

* * * * *